(12) United States Patent
Rondeau et al.

(10) Patent No.: US 6,210,784 B1
(45) Date of Patent: Apr. 3, 2001

(54) TRANSPARENT SUBSTRATE PROVIDED WITH A THIN-FILM STACK

(75) Inventors: Véronique Rondeau, Drancy (FR); Fabrice Didier, Köln (DE)

(73) Assignee: Saint-Gobain Vitrage, Courbevoie (FR)

( * ) Notice: Subject to any disclaimer, the term of this patent is extended or adjusted under 35 U.S.C. 154(b) by 0 days.

(21) Appl. No.: 09/422,942

(22) Filed: Oct. 22, 1999

(30) Foreign Application Priority Data

Oct. 22, 1998 (FR) .................................................. 98 13250

(51) Int. Cl.$^7$ ...................................................... B32B 17/06
(52) U.S. Cl. ........................ 428/212; 428/216; 428/332; 428/336; 428/432; 428/433; 428/446; 428/697; 428/699; 428/701; 428/702; 359/580; 359/585
(58) Field of Search ..................................... 428/212, 216, 428/428, 336, 432, 433, 469, 472, 622, 623, 633, 697, 698, 699, 701, 702; 359/580, 585

(56) References Cited

U.S. PATENT DOCUMENTS

| | | | |
|---|---|---|---|
| 5,156,894 | * | 10/1992 | Hood et al. . |
| 5,763,064 | * | 6/1998 | Suzuki et al. . |
| 5,837,361 | * | 11/1998 | Glaser et al. . |
| 5,935,702 | * | 8/1999 | Macquart et al. . |
| 5,962,115 | * | 10/1999 | Zmelty et al. . |
| 5,965,246 | * | 10/1999 | Guiselin et al. . |
| 6,045,896 | * | 4/2000 | Boire et al. . |
| 6,055,088 | * | 4/2000 | Fix et al. . |

FOREIGN PATENT DOCUMENTS

| | | | |
|---|---|---|---|
| 19520843 | * | 12/1996 | (DE) . |
| 219273A | * | 4/1987 | (EP) . |
| 0678484 | * | 10/1995 | (EP) . |
| 0747330 | * | 12/1996 | (EP) . |
| 0747330A1 | * | 12/1996 | (EP) . |
| 0773197 | * | 5/1997 | (EP) . |
| 0870601 | * | 10/1998 | (EP) . |
| 10236848A | * | 9/1998 | (JP) . |

* cited by examiner

Primary Examiner—Deborah Jones
Assistant Examiner—Jennifer McNeil
(74) Attorney, Agent, or Firm—Pennie & Edmonds LLP

(57) ABSTRACT

The invention relates to a transparent substrate, in particular made of glass, provided with a thin-film stack including at least one metallic layer with infrared reflection properties, in particular a low-emission. layer, arranged between two dielectric-based coatings, the underlying coating having a wetting layer based on zinc oxide ZnO, optionally doped with aluminium ZnO:Al, directly in contact with the metallic layer.

According to the invention, each of the two coatings based on the dielectric material comprises at least one layer with high refractive index, greater than or equal to 2.2.

22 Claims, 2 Drawing Sheets

TRANSPARENT SUBSTRATE PROVIDED WITH A THIN-FILM STACK

BACKGROUND OF THE INVENTION

The invention relates to a transparent substrate, in particular made of glass, provided with a thin-film stack including at least one metallic layer with infrared reflection properties, in particular a low-emissivity layer, arranged between two dielectric-based coatings.

The main application which the invention addresses is the use of such a substrate for the manufacture of thermal-insulation and/or solar-protection windows.

These are intended to be fitted both to buildings and to vehicles, in particular with a view to decreasing the air-conditioning workload and/or reducing excessive overheating entailed by the ever-increasing size of glazed areas in rooms and passenger compartments.

One type of thin-film stack well-known for giving a transparent substrate thermal properties, in particular low-emissivity properties, which is suited to the aforementioned required application consists of a metallic layer, in particular one made of silver, arranged between two dielectric-based coatings of the metal oxide type. This stack is, in the usual way, manufactured using a sequence of depositions carried out using a vacuum technique, for example sputtering, where appropriate assisted by a magnetic field.

A layer having a protective role for preventing degradation of the silver may also be provided in this stack.

In this type of stack, the silver layer essentially dictates the thermal, solar-protection and/or low-emissivity performance of the final window, whereas the dielectric layers primarily affect the optical appearance of the window obtained through interference. They furthermore have a function of protecting the silver layer against chemical and/or mechanical attack.

The improvements made to windows provided with stacks of the aforementioned type have so far allowed their field of application to be increased, while allowing them to keep a satisfactory level of thermal and optical performance.

Regarding the latter point, however, thermal performance is susceptible of yet further improvement, in particular with a lower insulation coefficient K being obtained.

SUMMARY OF THE INVENTION

The object of the invention is therefore to provide a substrate provided with a thin-film stack of the aforementioned type, having improved thermal performance, but without this being to the detriment of its optical performance.

To that end, the invention relates to a transparent substrate, in particular made of glass, provided with a thin-film stack including at least one metallic layer with infrared reflection properties, in particular a low-emission layer, arranged between two dielectric-based coatings, the underlying coating having a wetting layer based on zinc oxide ZnO, optionally doped with aluminium ZnO:Al, directly in contact with the metallic layer.

According to the invention, each of the two coatings based on the dielectric material comprises at least one layer with high refractive index, preferably greater than or equal to 2.2.

It is to be noted that, in the context of the invention, a high refractive index means strictly greater than 2.

The combination according to the invention makes it possible to obtain a substrate both with very low emission and with very high optical transmission, these being performance features that are never achieved according to the prior art.

The calorimetric appearance of the substrate in reflection furthermore remains sufficiently neutral.

In order to achieve the solution according to the invention, the inventors firstly observed that, according to the prior art, it was necessary firstly to have a metallic layer thick enough to be able to achieve low enough an emissivity value, and that the presence of zinc oxide ZnO as a wetting layer directly in contact with the metallic layer precisely made it possible to limit the thickness of the aforementioned metallic layer to a value of the order of a few nanometers, typically of the order of 15 nanometers. They were then able to demonstrate that, in spite of the limitation of the thickness of the silver layer provided by the presence of the zinc oxide ZnO, it was not easy to obtain a low optical reflection value $R_L$.

The inventors thought they had to resort to the insertion of a single high-index material, an effect which is known per se.

Surprisingly, they found that the insertion of this type of material on either side of the metallic layer not only optimized the desired anti-reflection effect. In addition, the fact that, according to the invention, the high-index layer of the upper dielectric coating is not in direct contact with the environment, such as air, this makes it possible to have a better colorimetric appearance of the substrate in reflection.

The functional metallic layer is advantageously based on silver. Its thickness may be selected between 7 et 20 nanometers, in particular between 9 and 15 nanometers, when it is desired to obtain windows with low emissivity and high optical transmission (in particular a $T_L$ of at least 70 to 80%), particularly for those intended to be fitted to buildings in cold countries. When the desire is for reflective windows with a solar-protection function, which are intended rather to be fitted to buildings in hot countries, the silver layer may be thicker, for example between 20 and 25 nm (which clearly has the consequence of producing windows with much lower optical transmission, for example less than 60%).

Preferably, provision may be made for the stack according to the invention to have a protective metallic layer placed immediately above and in contact with the layer with infrared reflection properties.

The protective layer provided is advantageously based on a single metal selected from niobium Nb, titanium Ti, chromium Cr or nickel Ni or an alloy of at least two of these metals, in particular an alloy of nickel and chromium (Ni/Cr), and has a geometrical thickness of less than or equal to 2 nm. According to this variant, the metal or the alloy constituting the protective layer may be doped with palladium Pd. It fulfils its role as a "sacrificial" layer with the aim of protecting the functional layer in the case of depositing the next layer by reactive sputtering.

The wetting layer based on zinc oxide ZnO according to the invention preferably has a geometrical thickness of between 5 and 40 nm, in particular between 15 and 30 nm. With such thicknesses, further to its wetting function, it can contribute to adjusting the optical appearance of the stack in combination with the dielectric coating lying above the functional layer.

The wetting layer is advantageously based on at least partly crystallized zinc oxide. Such a layer makes it possible to avoid penalizing the stack from an optical point of view in the case when the carrier substrate if subjected to a heat treatment such as tempering or bending.

Each of the layers with high refractive index according to the invention can be arranged directly under the wetting layer if it is present, and may advantageously be based on a material selected from niobium oxide $Nb_2O_5$, manganese-doped bismuth oxide $Bi_2O_3$:Mn, a mixed oxide of zinc and titanium $ZnTiO_x$, titanium oxide $TiO_2$, a mixed oxide of tantalum and titanium $TiTaO_x$, or a mixed oxide of zirconium and titanium $ZrTiO_x$.

Of these materials, titanium oxide $TiO_2$ is particularly preferred, in particular because of its compatibility with the other layers in the stack according to the invention.

According to one variant of the invention, the dielectric coating above the reflective metallic layer has a superposed set of layers, including the layer with index greater than or equal to 2.2 and at least one layer whose refractive index is low, in particular less than or equal to 1.8, in particular less than or equal to 1.6. It may, for example, be a layer of $SiO_2$, SiON or SiOAl.

According to another variant, the dielectric coating above the reflective metallic layer may also have, as an alternative or in addition to the first variant, a superposed set of layers, including the layer of index greater than or equal to 2.2 on top of which, in particular in direct contact with which, there is a layer with medium index, in particular with index between 1.9 and 2.1. It may be, for example, a layer of $SnO_2$, $Si_3N_4$, AlN, ZnO.

Clearly, these two variants can also be applied in a similar way to the dielectric coating underlying the reflective metallic layer.

In order to obtain a more neutral colour of the substrate according to the invention in reflection, the dielectric-based coating arranged above the metallic layer has the following sequence of layers deposited in this order:

a) layer(s) with material(s) with refractive index $n_{i-2}$ of at most 2.2, in particular less than 2.2 or between 1.9 and 2.1; (for example $SnO_2$, $Si_3N_4$, AlN or ZnO);

b) layer(s) with material(s) with refractive index $n_{i-2}$, at least 0.3 less than that $n_i$ of the last layer(s), in particular less than 1.8 or 1.6 (for example $SiO_2$, SiON or SiOAl);

c) last layer(s) with material(s) with refractive index $n_i$ substantially equal to $n_{i-2}$ (again, in particular, made of $SnO_2$, $Si_3N_4$ or AlN).

In this figurative case, advantageously, there is the layer with index of the TiO2 type arranged between the reflective metallic layer and the sequence of layers a), b), c). Multi-layer dielectric coatings are advantageous because, by regulating the differences in index between the layers, in particular alternating layers with high and low index, it is possible to obtain excellent thermal insulation properties which are not obtained to the detriment of the optical properties. These multilayer coatings can further improve the appearance of the window in external reflection.

By way of a preferred illustration, one stack meeting the criteria of the invention is of the type:

Glass/$TiO_2$ or $Nb_2O_5$ or $ZnTiO_x$/ZnO/Ag/Ti or Nb/$TiO_2$ or $Nb_2O_5$ or $ZnTiO_x$/$SnO_2$ or $Si_3N_4$ or (ZnO/$Si_3N_4$) or (SnO2/$SnZnO_x$)

The $Si_3N_4$ may be replaced by AlN or by a mixed Si—Al nitride.

The substrate defined above is noteworthy in that it has an emissivity ε of at most 0.025.

The invention also relates to low-emission or solar-protection multiple glazing, in particular double glazing, having the substrate described above, the thin-film stack being at faces 2 and/or 3 and, where appropriate, at face 5.

Lastly, the invention relates to low-emission double glazing having at least one substrate defined above, which is noteworthy in that it has an optical transmission $T_L$ of at least 72%.

Such double glazing, which has two panes of glass, is characterized by a coefficient K less than or equal to 1.4 W/K.m² when the two panes of glass are separated by a layer of air, or less than or equal to 1.1 W/K.m² when the two panes of glass are separated by a layer of argon.

BRIEF DESCRIPTION OF THE DRAWINGS

Other details and advantageous characteristics will become apparent on reading the detailed description of the following nonlimiting examples which are given with reference to FIGS. 1 to 4.

Examples 1 and 2 are carried out in accordance with the invention.

Examples 3 and 4 are given by way of comparative examples.

DETAILED DESCRIPTION OF THE DRAWINGS

In all these examples, the successive thin-film depositions were carried out using a technique of sputtering assisted by magnetic field. In the scope of the invention, they can quite clearly be carried out using any other technique which allows the thicknesses of the layers obtained to be controlled properly.

The substrates on which the thin-film stacks were deposited are substrates made of clear silica-soda-lime glass of the type marketed by the company SAINT-GOBAIN VITRAGE under the name "PLANILUX".

It should be pointed out that, for the sake of clarity, the various proportions between the thicknesses of the materials have not been respected in the figures.

EXAMPLE 1—(ACCORDING TO THE INVENTION)

Figure 1:
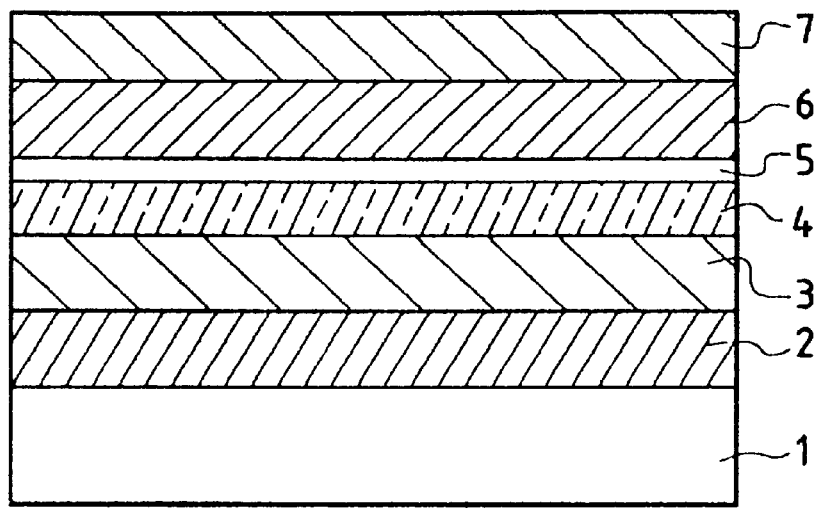

FIG. 1 shows that, on top of the substrate 1, there is respectively a layer 2 based on titanium oxide $TiO_2$, a wetting layer 3 based on zinc oxide ZnO, then a layer 4 of silver, a protective layer 5 of titanium Ti, and a layer 6 based on titanium oxide $TiO_2$, on top of which there is a layer 7 of tin oxide $SnO_2$.

The stack is therefore of the type:

Glass/$TiO_2$/ZnO/Ag/Ti/$TiO_2$/$SnO_2$

Table 1 below indicates the thickness in nanometers corresponding to each layer in the stack on top of the 4 mm thick substrate.

TABLE 1

| | | |
|---|---|---|
| $TiO_2$ | (2) | 14 |
| ZnO | (3) | 10 |
| Ag | (4) | 15 |
| Ti | (5) | 1.2 |
| $TiO_2$ | (6) | 8 |
| $SnO_2$ | (7) | 34 |

In order to produce this stack, the recommended deposition conditions for each of the layers were the following:

the layers 2 and 6 based on $TiO_2$ were deposited using a titanium target under a pressure of $3.10^{-3}$ mbar, in an Ar/$O_2$ atmosphere;

the layer 3 based on ZnO was deposited using a zinc target, under a pressure of $8\times10^{-3}$ mbar, in an argon/oxygen atmosphere;

the silver layer 4 was deposited using a silver target, under a pressure of $8\times10^{-3}$ mbar, in an argon atmosphere;

the layer 5 of Ti was deposited using a titanium target, under a pressure of $8\times10^{-3}$ mbar, in an argon atmosphere;

the layer 7 of $SnO_2$ was deposited using a tin target under a pressure of $1,5\times10^{-3}$ mbar, in an $Ar/O_2$ atmosphere.

The powers and the rates of movement of the substrate were adjusted in a manner which is known per se in order to obtain the desired thicknesses above.

Table 2 below indicates respectively the optical transmission value $T_L$ as a percentage, the optical reflection value $R_L$, also as a percentage, the values $a^*(R)$ and $b^*(R)$, in reflection, in the $(L, a^*, b^*)$ colorimetry system, no units, as well as the emissivity value $\epsilon$, no units. All these measurements are made with reference to the $D_{65}$ illuminant.

TABLE 2

| Example 1 - (Monolithic substrate) | |
|---|---|
| $T_L$ | 79.5 |
| $R_L$ | 12.5 |
| $a^*(R)$ | 2.0 |
| $b^*(R)$ | −11.7 |
| $\epsilon$ | 0.023 |

The substrate 1 defined above is then assembled as double glazing with another bare clear glass substrate with a geometrical thickness equal to 4 mm, with a 15 mm thick intermediate argon layer, the thin-film stack being at face 3.

The table 3 below again gives the same characteristics $T_L$, $R_L$, $a^*(R)$, $b^*(R)$, $\epsilon$ as well as the value of the coefficient K in $W/K.m^2$ of the double glazing.

TABLE 3

| Example 1 - (Double glazing) | |
|---|---|
| $T_L$ | 72.5 |
| $R_L$ | 18.4 |
| $a^*(R)$ | 0.2 |
| $b^*(R)$ | −7.5 |
| $\epsilon$ | 0.023 |
| K | 1.0 |

EXAMPLE 2—(ACCORDING TO THE INVENTION)

Figure 2:
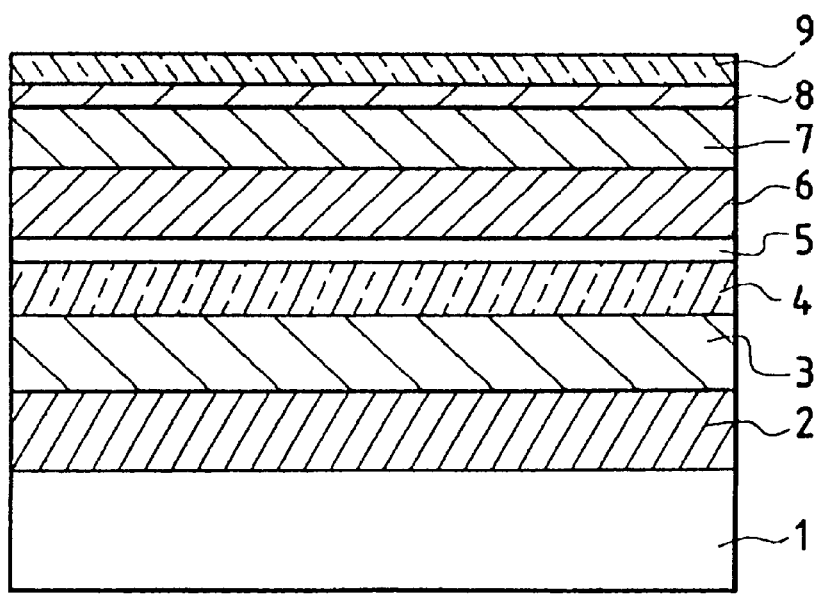

The thin-film stack represented in FIG. 2 is identical to that in Example 1, except for the fact that the layer 7 based on tin oxide $SnO_2$ has been covered with a layer 8 based on $SiO_2$ with a refractive index equal to 1.45 and with a last layer in the stack 9 based on silicon nitride $Si_3N_4$.

The stack therefore has the following sequence:

Glass/$TiO_2$/ZnO/Ag/Ti/$TiO_2$/$SnO_2$/$SiO_2$/$Si_3N_4$

The layer 8 based on $SiO_2$ according to the invention has a thickness of 15 nm.

This layer 8 based on $SiO_2$ was deposited by plasma-assisted reactive sputtering in an argon/oxygen atmosphere at a pressure of about $1.5\times10^{-3}$ mbar.

The layer 7 based on tin oxide $SnO_2$ has a thickness of 25 nm. It was deposited in an identical way to the one (3) in Example 1.

The layer 9 based on silicon nitride has a thickness of 10 nm and was deposited at a pressure of about $8.10^{-3}$ mbar in an argon/nitrogen atmosphere.

The thickness of the layer 6 based on $TiO_2$ is 11 nm, and the other layers have the same thicknesses as those relating to Example 1.

Table 4 below respectively indicates the values $T_L$, $R_L$, $a^*(R)$, $b^*(R)$, $\epsilon$ of the monolithic substrate relating to this example.

TABLE 4

| Example 2 - (Monolithic) | |
|---|---|
| $T_L$ | 78.6 |
| $R_L$ | 14.8 |
| $a^*(R)$ | 1.3 |
| $b^*(R)$ | −4.4 |
| $\epsilon$ | 0.023 |

This substrate is then assembled to form double glazing with another clear glass substrate of the same thickness, equal to 4 mm, with an intermediate 15 mm layer of argon, the stack according to the invention being at face 3 of the double glazing.

The table 5 below again gives the same characteristics $T_L$, $R_L$, $a^*(R)$, $b^*(R)$, $\epsilon$ as well as the value of the coefficient K in $W/K.m^2$ of the double glazing.

TABLE 5

| Example 2 - (Double glazing) | |
|---|---|
| $T_L$ | 71.7 |
| $R_L$ | 20.2 |
| $a^*(R)$ | −0.2 |
| $b^*(R)$ | −2.6 |
| $\epsilon$ | 0.023 |
| K | 1.0 |

EXAMPLE 3—(COMPARATIVE)

Figure 3:
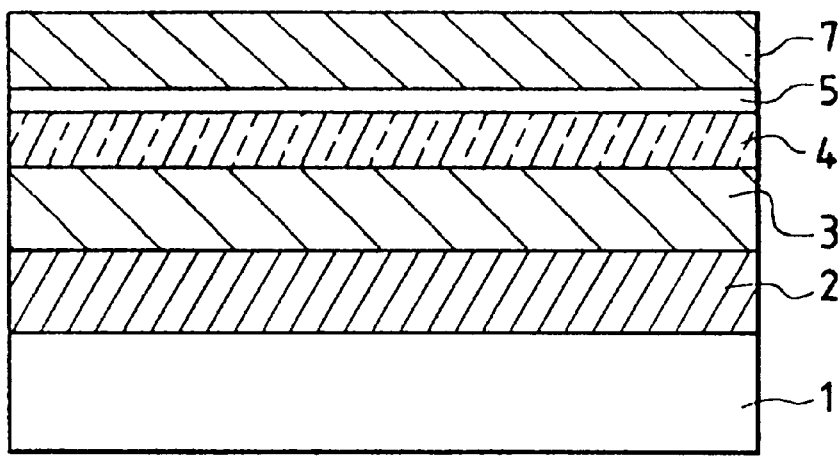

The thin-film stack represented in FIG. 3 is identical to the one in Example 1, except for the fact that it has a single layer based on $TiO_2$ according to the invention.

This layer is contained in the dielectric coating underlying the layer based on silver Ag.

The stack therefore has the following sequence:

Glass/$TiO_2$/ZnO/Ag/Ti/$SnO_2$

Table 6 below respectively indicates the values $T_L$, $R_L$, $a^*(R)$, $b^*(R)$, $\epsilon$ of the monolithic substrate relating to this example.

TABLE 6

| Example 3 - (Monolithic) | |
|---|---|
| $T_L$ | 76.0 |
| $R_L$ | 16.9 |
| $a^*(R)$ | 2.3 |
| $b^*(R)$ | −6.4 |
| $\epsilon$ | 0.023 |

This substrate is then assembled to form double glazing with another clear glass substrate of the same thickness, equal to 4 mm, with an intermediate 15 mm layer of argon, the stack according to the invention being at face 3 of the double glazing.

The table 7 below again gives the same characteristics $T_L$, $R_L$, $a^*(R)$, $b^*(R)$, $\epsilon$ as well as the value K in $W/K.m^2$ of the double glazing.

TABLE 7

| Example 3 - (Double glazing) | |
|---|---|
| $T_L$ | 69.7 |
| $R_L$ | 22.5 |
| a*(R) | 0.8 |
| b*(R) | -4.8 |
| ε | 0.023 |
| K | 1.0 |

EXAMPLE 4—(COMPARATIVE)

Figure 4:
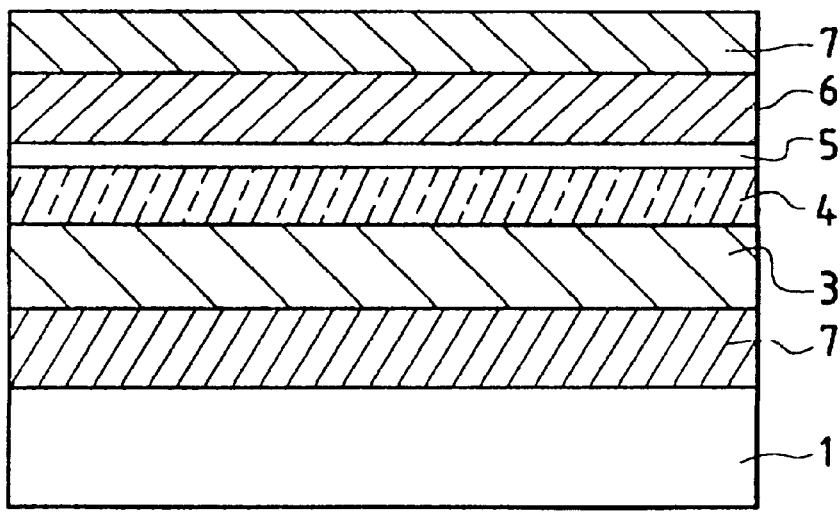

The thin-film stack represented in FIG. 4 is identical to the one in Example 1 according to the invention, except for the fact that it comprises a single layer based on $TiO_2$ present in the dielectric layer on the layer of silver Ag.

The stack therefore has the following sequence:

$Glass/SnO_2/ZnO/Ag/Ti/TiO_2/SnO_2$

Table 8 below respectively indicates the values $T_L$, $R_L$, a*(R), b*(R), ε of the monolithic substrate relating to this example.

TABLE 8

| Example 4 - (Monolithic) | |
|---|---|
| $T_L$ | 71.8 |
| $R_L$ | 19.8 |
| a*(R) | 2.8 |
| b*(R) | -9.2 |
| ε | 0.023 |

This substrate is then assembled to form double glazing with another clear glass substrate of the same thickness, equal to 4 mm, with an intermediate 15 mm layer of argon, the stack according to the invention being at face 3 of the double glazing.

The table 9 below again gives the same characteristics $T_L$, $R_L$, a*(R), b*(R), ε as well as the value of the coefficient K in $W/K.m^2$ of the double glazing.

TABLE 9

| Example 4 - (Double glazing) | |
|---|---|
| $T_L$ | 66.2 |
| $R_L$ | 24.9 |
| a*(R) | 1.1 |
| b*(R) | -7.1 |
| ε | 0.023 |
| K | 1.0 |

What is claimed is:

1. Transparent substrate provided with a thin-film stack including at least one low-emissivity metallic layer with infrared reflection properties arranged between underlying and overlying dielectric-based coatings, the underlying coating having a wetting layer based on zinc oxide ZnO, or aluminum-doped zinc oxide ZnO:Al, which is directly in contact with the metallic layer, wherein each of the two coatings based on the dielectric material comprises at least one layer with a high refractive index of greater than or equal to 2.2, and wherein the overlying dielectric-based coating has the following sequence of layers deposited in the order stated;

a) first layer(s) of material(s) having a refractive index $n_{i-2}$ of less than 2.2;

b) intermediate layer(s) of material(s) having a refractive index $n_{i-2}$;

c) last layer(s) of material(s) having a refractive index $n_i$ substantially equal to $n_{i-2}$.

wherein $n_{i-1}$ of the intermediate layer is at least 0.3 less than $n_i$ of the last layer; and further comprising a layer with refractive index that is greater than or equal to 2.2 arranged between the reflective metallic layer and the sequence of layers the overlying dielectric-based coating.

2. Substrate according to claim 1, characterized in that the metallic layer with infrared reflection properties is based on silver.

3. Substrate according to claim 1, wherein the metallic layer with infrared reflection properties has a geometrical thickness of between 7 and 20 nanometers, so as to give it low-emissivity properties, or between 20 and 25 nanometers so as to give it solar-protection properties.

4. Substrate according to claim 1, wherein a protective metallic layer is placed immediately above and in contact with the layer with infrared reflection properties.

5. Substrate according to claim 4, wherein the said protective metallic layer is based on a single metal selected from niobium Nb, titanium Ti, chromium Cr or nickel Ni or an alloy of at least two of these metals, and has a geometrical thickness of less than or equal to 2 nanometers.

6. Substrate according to claim 1, wherein the wetting layer has a geometrical thickness of between 5 and 40 nanometers.

7. Substrate according to claim 1, wherein the wetting layer is based on at least partly crystallized zinc oxide.

8. Substrate according to claim 1, wherein each of the layers with high refractive index is based on a material selected from niobium oxide $Nb_2O_5$, manganese-doped bismuth oxide $Bi_2O_3$:Mn, a mixed oxide of zinc and titanium $ZnTiO_x$, titanium oxide $TiO_2$, a mixed oxide of tantalum and titanium $TaTiO_x$, or a mixed oxide of zirconium and titanium $ZrTiO_x$.

9. Substrate according to claim 1, wherein the dielectric coating above the reflective metallic layer has a superposed set of layers, including the layer with index greater than or equal to 2.2 and a layer whose refractive index is less than or equal to 1.8, in particular less than 1.6.

10. Substrate according to claim 9 characterized in that the layer with an index lower than or equal to 1.8 is based on $SiO_2$, SiON, or SiOAl.

11. Substrate according to claim 1, wherein the dielectric coating above the reflective metallic layer has a superposed set of layers, including the layer of index greater than or equal to 2.2 on top of which there is a layer with lower index of between 1.9 and 2.1.

12. Substrate of claim 11 wherein the lower index layer comprises $SnO_2$, $Si_3N_4$, AlN, or ZnO.

13. Substrate according to claim 1, wherein the sequence of layers of the stack is as follows:

$Glass/TiO_2$ or $Nb_2O_5$ or $ZnTiO_x/ZnO/Ag/Ti$ or $Nb/TiO_2$ or $Nb_2O_5$ or $ZnTiO_x/SnO_2$ or $Si_3N_4$ or $(ZnO/Si_3N_4)$.

14. Substrate according to claim 1, wherein the substrate has an emissivity of at most 0.025.

15. Low-emission or solar-protection multiple glazing, in particular double glazing, having the substrate according to claim 1, with the thin-film stack being at faces 2 and/or 3 and at face 5.

16. Low-emission double glazing having at least one substrate according to claim 1, wherein said glazing has an optical transmission $T_L$ of at least 72%.

17. Double glazing according to claim 16, having two panes of glass, wherein said glazing has a coefficient K less than or equal to 1.4 W/K.m² when the two panes of glass are separated by a layer of air, or less than or equal to 1.1 W/K.m² when the two panes of glass are separated by a layer of argon.

18. Substrate according to claim 1, wherein the metallic layer with infrared reflection properties has a geometrical thickness which is either between 9 and 15 nanometers, so as to give it low-emissivity properties, or between 20 and 25 nanometers so as to give it solar-protection properties.

19. Substrate of claim 1 wherein the wetting layer has a geometrical thickness of between 15 and 30 nanometers.

20. Substrate of claim 1 wherein the refractive index of layer a) is between 1.9 and 2.1.

21. Substrate of claim 1 wherein the refractive index of layer b) is less than 1.8.

22. Transparent substrate provided with a thin-film stack including at least one metallic layer with infrared reflection properties, in particular a low-emissivity layer, arranged between underlying and overlying dielectric-based coatings, the underlying coating having a wetting layer based on zinc oxide ZnO, or aluminum-doped zinc oxide, ZnO:Al, directly in contact with the metallic layer, characterized in that each of the two coatings based on the dielectric material comprises at least one layer with high refractive index which is greater than or equal to 2.2, wherein each of the layers with high refractive index is based on a material selected from niobium oxide $Nb_2O_5$, manganese-doped bismuth oxide $Bi_2O_3$:Mn, a mixed oxide of zinc and titanium $ZnTiO_x$, titanium oxide $TiO_2$, a mixed oxide of tantalum and titanium $TaTiO_x$, or a mixed oxide of zirconium and titanium $ZrTiO_x$.

* * * * *

UNITED STATES PATENT AND TRADEMARK OFFICE
CERTIFICATE OF CORRECTION

PATENT NO. : 6,210,784 B1  
DATED : April 3, 2001  
INVENTOR(S) : Véronique Rondeau and Fabrice Didier It is certified that error appears in the above-identified patent and that said Letters Patent is hereby corrected as shown below:

Claim 1,  
Line 16, change "$n_{i-2}$" to -- $n_{i-1}$ --.

Signed and Sealed this

Fifth Day of February, 2002

Attest:

Attesting Officer

JAMES E. ROGAN  
Director of the United States Patent and Trademark Office